(12) United States Patent
Willett

(10) Patent No.: US 7,806,045 B2
(45) Date of Patent: Oct. 5, 2010

(54) SCHEDULING AND TRACKING SYSTEM AND METHOD FOR BAKERY PRODUCTS

(75) Inventor: Paul Eaton Willett, Whiteside (AU)

(73) Assignee: Moffat Pty Limited, Mulgrave, Victoria (AU)

( * ) Notice: Subject to any disclaimer, the term of this patent is extended or adjusted under 35 U.S.C. 154(b) by 191 days.

(21) Appl. No.: 11/915,259

(22) PCT Filed: May 24, 2006

(86) PCT No.: PCT/AU2006/000690

§ 371 (c)(1),
(2), (4) Date: Nov. 21, 2007

(87) PCT Pub. No.: WO2006/125260

PCT Pub. Date: Nov. 30, 2006

(65) Prior Publication Data

US 2008/0181992 A1 Jul. 31, 2008

(30) Foreign Application Priority Data

May 24, 2005 (AU) ............................. 2005902664
Sep. 6, 2005 (AU) ............................. 2005904878
Feb. 7, 2006 (AU) ............................. 2006900592

(51) Int. Cl.
A47J 27/00 (2006.01)

(52) U.S. Cl. ....................................................... 99/326

(58) Field of Classification Search ................. 426/391; 424/496, 509, 524; 99/326, 353, 348, 339, 99/357, 334, 441, 448, 470, 477, 494
See application file for complete search history.

(56) References Cited

U.S. PATENT DOCUMENTS

| 4,946,699 | A | 8/1990 | Kageyama et al. |
| 6,814,993 | B2 | 11/2004 | Yamagata et al. |
| 2002/0106432 | A1* | 8/2002 | Yamagata et al. ........... 426/496 |
| 2003/0049359 | A1 | 3/2003 | Kulkarni et al. |
| 2005/0022803 | A1* | 2/2005 | Dannenhauer et al. .. 126/273 R |

FOREIGN PATENT DOCUMENTS

| DE | 4403331 | 8/1995 |
| EP | 311240 | 4/1989 |
| FR | 2757746 | 7/1998 |

* cited by examiner

Primary Examiner—Tu B Hoang
Assistant Examiner—Thien Tran
(74) Attorney, Agent, or Firm—Andrus, Sceales, Starke and Sawall, LLP

(57) ABSTRACT

An apparatus for producing a bread product including: an input means for entering product variables; a processor for determining a production schedule for producing product; a thawer for thawing or partially thawing substantially planar frozen dough pieces; a moulder for working the thawed or partially thawed dough in accordance with predetermined process steps; and an oven for baking the product; the processor controlling or instructing an operator to control the operation of the thawer, shaper and oven.

10 Claims, 8 Drawing Sheets

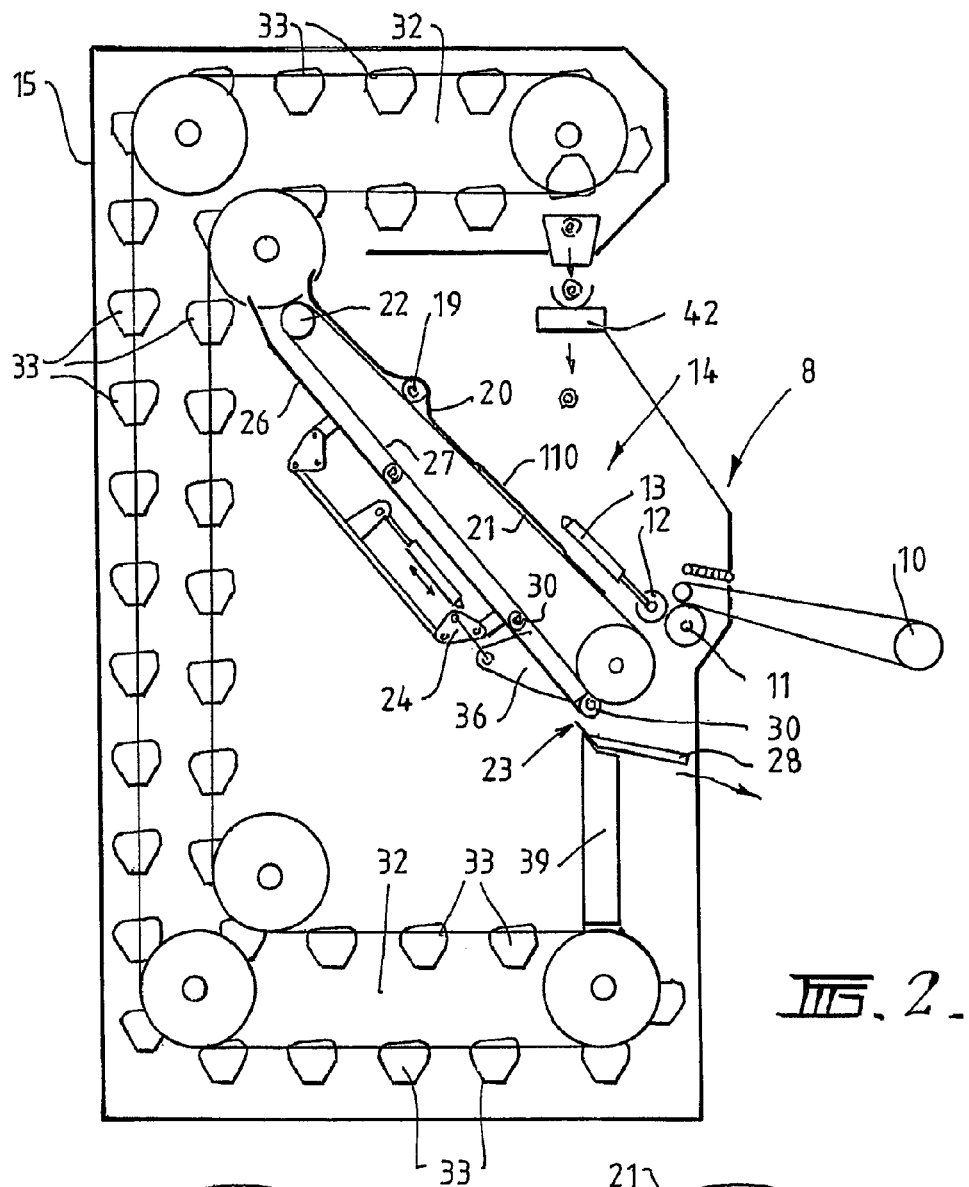
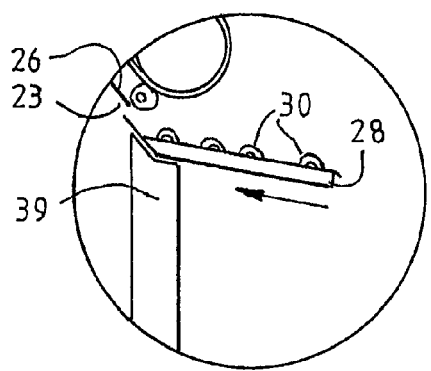
FIG. 3(a)
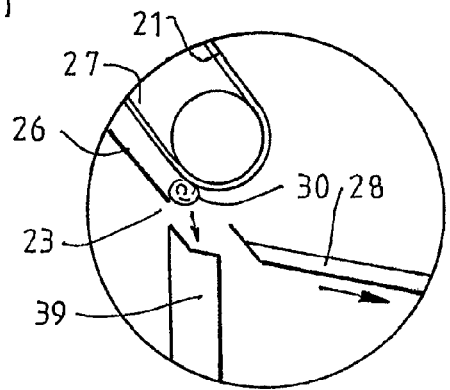
FIG. 3(b)
FIG. 2.

SCHEDULING AND TRACKING SYSTEM AND METHOD FOR BAKERY PRODUCTS

CROSS REFERENCE TO RELATED APPLICATION

The present application is the U.S. national stage application of International Application PCT/AU2006/000690, filed May 24, 2006, which international application was published on Nov. 30, 2006 as International Publication WO 2006/125260. The International Application claims priority to Australian Patent Application 2005902664, filed May 24, 2005; Australian Patent Application 2005904878 filed Sep. 6, 2005; and Australian Patent Application 2006900592 filed Feb. 7, 2006.

FIELD OF THE INVENTION

This invention relates to an improved bakery process and apparatus for carrying out the bakery process.

BACKGROUND OF THE INVENTION

In the bakery industry, two existing methods are used for the production and baking of raw dough in on-site bakeries or retail outlets.

The first method uses dough pieces which are quickly snap frozen into their frozen shape at a production facility. The frozen dough pieces are transported from the production facility to the retail outlet where they are stored in freezers. When required the frozen dough pieces are thawed. As the dough is already in the shape of the finished product, the thawed dough pieces are placed on baking utensils such as trays for proofing. Once the dough product has doubled in bulk, they are baked to provide the finished product.

This process has a number of advantages and disadvantages. One advantage of this method is that a large variety of low volume product can be produced daily. As the dough is already shaped, a low level of skill is required on the part of the operator and compared with other bakery processes, a smaller floor area is required which is easier to manage and keep clean. As such product is generally sold at smaller retail outlets, there is a synergy with other frozen products which are brought in and baked, such as pastry, pies and cake.

A disadvantage of this method is that the frozen dough pieces are in the shape of the finished product and therefore often bulky to transport. Furthermore the frozen dough pieces must be transported in refrigerated transports increasing the overall costs of the product.

With frozen dough it is essential that the thawing process is accurately controlled and completed if a consistent quality product is to be produced. If a number of different products are required then a number of different types of frozen dough need to be thawed. The shape, thickness, density and type of dough will vary depending on the type of product being produced, which will also determine the different timing and thawing conditions required. Thus if numerous products are to be produced, scheduling of the thawing process and the number of thawers becomes a limiting constraint. Furthermore in order for the thawed dough pieces to prove and rise, it is essential that the yeast culture is protected from the freezing process. This generally requires addition of preservative ingredients to the dough thereby increasing the costs of each frozen item. A further disadvantage is that the frozen item needs to be removed by hand from individual boxes in the freezer to be placed in receptacles in the thawer which is often a time consuming and uncomfortable process for the operator.

The second method of producing a wide range of bread and bun products for on-site bakeries and retail outlets involves mechanically making the product on-site. This requires the flour or pre-blended dried ingredients to be mixed, separated, weighed, rested, and finally moulded into the shape of the finished product. The shaped dough then goes through the same proof and baking process as thawed frozen dough. This method has a number of advantages including a lower cost per item, a better quality product with a better quality appearance. This process has the further benefit of being more versatile as the products are not restricted to those frozen items which come out of a box. Furthermore as a thawing process is not required, less time is required to go from the shaped dough product to the baked product.

The versatility and advantages of this process are generally weighed against the disadvantages of requiring more floor space and greater preparation time to produce the shaped dough. Furthermore a different dough must be made for each product type which takes time and is uneconomic in smaller volumes. Furthermore more skill is required on the part of the operator to produce quality products and as with a larger scale operation, the capital outlay on machinery is high and hygiene issues often arise.

Accordingly it is an object of the invention to provide a bakery process and apparatus for conducting the bakery process which overcomes at least some of the disadvantages of the earlier methods.

SUMMARY OF THE INVENTION

Accordingly, one aspect of the invention provides a method of producing a bread product including the steps of thawing a substantially planar frozen dough piece, shaping the thawed or substantially thawed dough piece, proving the shaped dough piece and baking the proofed, shaped dough piece.

In the context of the invention, a bread product is a product baked from a leavened or fermented dough. The dough includes a ground material from a cereal or leguminous crop, water and yeast.

The substantially planar frozen dough pieces are provided as the starting material for the product production process. The substantially planar frozen dough pieces themselves are produced by freezing substantially planar dough pieces.

The applicant has found that by providing the frozen dough pieces in a substantially planar shape in which each of the dough pieces is preferably of the same or similar size and thickness, a consistent thawing process can be applied to the frozen dough pieces. In order to produce a variety of products from the similar or identical shaped dough pieces, the thawed or substantially thawed dough pieces then undergo a shaping operation to present them into the final shape for proofing and baking. This process has the advantage of ensuring that all of the dough is uniformly thawed as required.

The applicant has also found that advantageously the substantially planar frozen dough pieces may be elongate in shape with the width being less than the length of the dough. In preferred forms, the length dimension is at least more than 2 times the width and preferably greater than 3 times the width. The dough preferably has two substantially planar surfaces with the distance between the planar surfaces being within the range of 6-15 mm and more preferably 10-12 mm.

The applicant has further found that during the thawing process of a substantially planar frozen dough piece, the shape produces a characteristic thaw pattern. This thaw pattern which is thought to be due to moisture migration from the centre of the dough piece results in moisture pooling on the top of each piece. As the dough thaws, the moist area on the dough becomes sticky making handling of the dough piece difficult.

Attempts to reduce the moisture collection during thawing proved unsuccessful often resulting in the formation of a dry crust on skin around the periphery of the dough piece while the middle often retained a wet surface.

To overcome this problem, the applicant found that directing warm air onto the centre of the frozen dough piece for a predetermined period of time dried the still frozen surface of the dough.

In a preferred aspect the invention provides a method of thawing frozen dough including the step of directing gas onto the substantially planar frozen dough piece for a predetermined period of time. The gas preferably has an initial temperature in the range of greater than in the range of 5-15 liters per second, preferably 30° C. and preferably greater than 35° C. up to a maximum of 38° C. at a gas flow of approximately 10 liters per second, per dough piece, equating to a velocity in the range of 5-15 meters per second, preferably of approximately 10 meters per second. The substantially planar frozen dough piece may be subjected to the gas blast at this temperature for 1-30 minutes preferably 90 seconds to 25 minutes, and more preferably about 10-20 minutes.

The heated gas may be directed onto the frozen dough continuously during the thawing process. However, to prevent excessive drying of the dough surface, intermittent blasts of gas over variable lengths of time are used.

After the initial heated gas blast, the temperature of the gas directed onto the frozen dough is reduced to 25-35° C. and continued for a period of time between 1-30 minutes, preferably 90 seconds to 25 minutes, and more preferably 10-20 minutes. The gas which is generally air is preferably at the ambient air temperature of the bakery.

Over the course of the thawing cycle, the forced air may be intermittently reduced or switched off and heated air from heating elements in the thawer passed through the slots in the thawing chamber.

Preferably the air blast is applied before any thawing of the frozen dough piece has occurred. After the air blast has been applied, the frozen dough piece is subjected to a controlled thaw where the temperature and humidity of the environment or atmosphere around the dough is controlled until a predetermined dough temperature is reached. The thawing cycle may be 30 to 90 minutes in total with a preferred thawing time of 60 minutes. The thawing method preferably heats the dough piece up to at least 22° C. The temperature of the dough is determined by a sensor on or below the surface of the dough. Once the dough has reached this temperature it may then be processed further.

In a further aspect, the invention provides a thawer for frozen dough including an enclosure having a means to direct a stream of warm gas onto frozen dough within enclosure. The means to direct warm gas may include a plenum having a plurality of outlets. The gas is preferably air.

The enclosure may be provided with means to receive trays or other conveyance mean to carry at least one frozen dough piece. The plenum outlets directing warm gas onto the individual dough pieces. The tray or conveyance is preferably received in a fixed or predetermined position relative to the plenum. The tray or conveyance may be further provided with indicia to locate the position of the frozen dough pieces on the tray so that when the frozen dough pieces are loaded into the thawer they are in predetermined positions relative to the plenum outlets.

The temperature of the warm air onto the dough pieces and preferably the temperature and humidity within the enclosure is controlled to ensure that the frozen dough pieces are heated in a pre-set or pre-determined temperature environment for a predetermined time period.

In another aspect, the invention further provides an apparatus for producing a bread product including a means to thaw a substantially planar frozen dough piece, means to process the thawed dough pieces in accordance with predetermined processing steps, means to prove the processed and shaped dough pieces and an oven to bake the shaped dough pieces.

In one form of this aspect, the frozen dough pieces may be provided on a first carrier medium. The first carrier medium may be a sheet of separation paper which enables the frozen dough pieces to be easily separated therefrom. The first carrier medium may incorporate identification indicia which may be used to identify the type of dough. As the dough pieces are substantially planar and sized to their requirements, a plurality of similar dough pieces may be placed on a single sheet of carrier medium. The plurality of planar dough pieces on a single carrier medium may then be stacked in a packaging container with the carrier medium separating the layers of frozen dough pieces.

According to this aspect the invention provides a method of producing a bread product comprising the steps of thawing at least one substantially planar frozen dough piece, the frozen dough piece being provided on a carrier medium having an indicia to identify the at least one frozen dough piece, shaping and processing the thawed dough piece in accordance with pre-determined processing steps required to produce the desired shaped product, proofing the processed dough pieces, and baking the processed dough pieces to produce the baked bread product.

The indicia may be read to provide information to a thaw controller to provide control to the thawing process in a thawer.

In a preferred form of this aspect of the invention, the shaped dough pieces are placed onto a second carrier medium having indicia to identify the type of product to be produced from the dough pieces on the carrier medium. It is preferable that each sheet of second carrier medium have a plurality of shaped dough pieces thereon and that each shaped dough piece has been shaped and processed by the same shaping steps. The shaped dough pieces may then be proofed and baked.

A finishing control means may read the indicia on the second carrier media as the shaped dough pieces begin and end the proofing step at the commencement of the baking step and at completion of the baking step to provide control and production data for this step of the operation.

In another aspect of the invention there is provided an apparatus for producing a bread product comprising a means to thaw a substantially planar frozen bread dough, the frozen dough pieces being provided on a carrier media with indicia for identification of the frozen dough, means to process the thawed dough pieces in accordance with predetermined processing steps appropriate to the identification of the dough pieces, means to prove the processed dough pieces, and an oven to bake the processed and shaped dough pieces.

The indicia may be read by a reader to provide information to a thaw controller to provide control to the thawing process in a thawer.

After the thawed dough pieces have been processed and shaped, a second carrier medium may be provided with indicia identifying the shaped dough pieces. The time and/or location of the identification data may be recorded on a process controller to provide control and production data on the proofing and baking of the shaped dough piece.

In another aspect of the invention there is provided a method of determining a production schedule comprising the steps of:
(i) entering the number of each product required and optionally the dough type for each product;
(ii) determining the number of each type of planar frozen dough pieces required;
(iii) determining an order for producing each product on the production schedule; and
(iv) controlling the operation of a thawer, shaping apparatus, optionally the prover and oven to produce product according to the production schedule.

In step (i), the type of dough for each product can be determined from the type of product and this information may be stored in the process controller.

In a preferred form of this aspect of the invention, the step of determining the number of each type of frozen dough piece may further comprise determining the number of boxes of frozen dough pieces and outputting the determination to an operator for collection or automated system of transporting the required number of boxes to the thawer for thawing.

Additionally the step of determining the order for producing each product preferably prioritises the order of frozen dough thawing and processing based on at least one of the type of product to be produced, the type of dough and the time when the product is required.

In another aspect, there is provided a computer program for carrying out the method above.

In another aspect, the invention provides a frozen dough piece for use in producing a bakery product, the frozen dough piece including two substantially planar surfaces, the distance between the planar surfaces being within the range of 6-15 mm.

In a preferred form of the invention, the bakery product is a bread dough based bakery product. The thickness of the frozen dough piece is preferably 10-12 mm.

The applicant has found that frozen dough pieces in accordance with this aspect of the invention are advantageously used in the aspects of the invention described above.

BRIEF DESCRIPTION OF THE DRAWINGS

Further features, objects and advantages of the present invention will become more apparent from the following description of the preferred embodiment and accompanying drawings in which:

FIG. 2 is an enlarged view of the moulding and processing equipment shown in FIG. 1;

FIG. 3(a) is an exploded schematic view of the exit end of the moulder of FIG. 2 with tray in;

FIG. 3(b) is an exploded schematic view of the exit end of the moulder of FIG. 2 with the tray out;

DETAILED DESCRIPTION OF THE EMBODIMENTS

Figure 1:
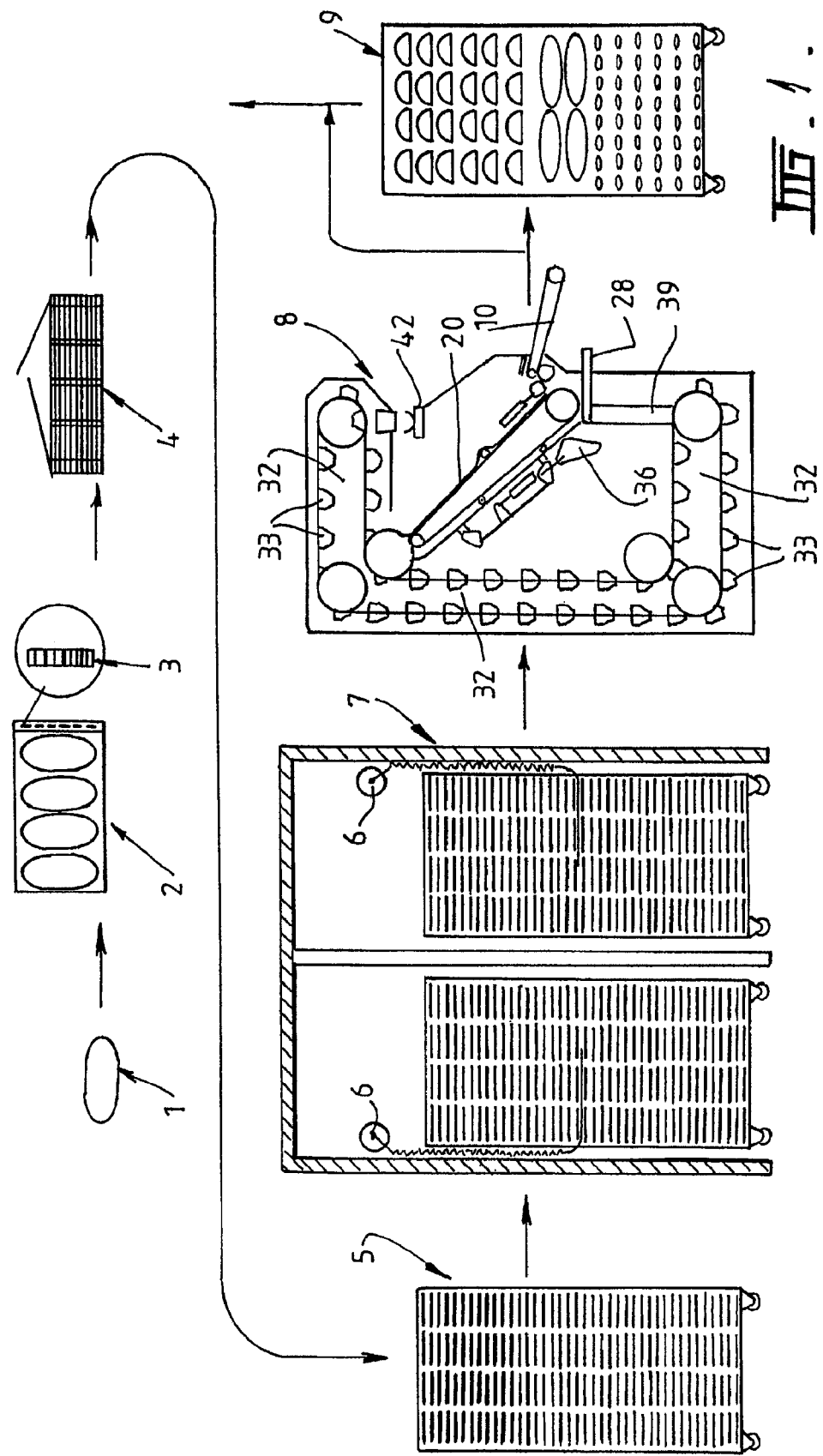
FIG. 1 is a schematic flow diagram of an embodiment of the present invention.

Referring to FIG. 1, the process begins with the frozen dough pieces, which for supply purposes are preferably only made in one shape irrespective of the weight or type of dough from which the dough pieces are made.

The applicant has found in order to provide an adequate thawed dough for use in a number of the processes described above, the frozen dough piece is preferably within a thickness range of 6-15 mm, and more preferably a range of 10-12 mm.

It is desirable that the frozen dough piece be robust, be able to be transported and be able to withstand commercial handling practices. The frozen dough piece should also be of a shape so that as to be quick and easy to handle in frozen form as pieces broken off during handling can lead to under weight pieces.

Furthermore, it has been found that frozen dough pieces that are too thin ie. less than 6 mm are not only difficult to pack, process and handle but also are not able to go through a thorough degassing action which is necessary as the thawed dough piece passes through the moulder sheet rollers.

One of the benefits of the invention is the relatively short and consistent thaw times needed to fully thaw the frozen dough. This thaw time can be accelerated by a combination of increased temperature and controlled humidity during the thaw. However in order to maintain an adequate water content in the outer layer of the dough as it thaws, the temperature in the thawer can not be increased too high without also increasing the humidity in the cabinet by the introduction of moisture or steam.

Hence, there is a limit to the temperature of which the dough thaws which in turn limits the thickness of the frozen dough. It has been found that if the frozen dough has a thickness greater than 15 mm, an adequate and consistent moisture content in the outer layer of the dough is difficult to maintain.

As mentioned above, the frozen dough pieces are preferably between 6 and 15 mm with a thickness in the range of 10-12 mm most preferred. A 400 gm dough ball will naturally form a planar piece approximately 350 mm long, 100 mm wide and 10-12 mm thick depending on the weight of the dough. The dough pieces will not be a regular triangular shape but preferably an elliptical shape.

As the planar piece has a large surface area compared to a spherical piece of the same weight (typically 840 $cm^2$ in the example above compared to 251 $cm^2$ for a conventional round dough piece), the piece can be snap frozen relatively inexpensively.

In addition to the greater surface area available for freezing, the distance to freeze the dough to the core is 5-6 mm compared to 20 mm in the case of a conventional spherical piece.

During the freezing process, the dough can quickly be partly snap frozen to approximately −2° C. after which the piece can be fully slow frozen in a conventional storage freezer. This allows substantial reductions in the freeze time of 75% compared to a conventional shape thereby greatly reducing freezing costs.

Producing the base product only in the shape described above has the advantages of easy manufacture, fast and substantially uniform freezing due to the thin thickness, and space efficient packaging. Boxes 4 preferably, of the same size, can be used for packaging, and the box size would ideally be 450 mm wide inside×900 mm, with any height found suitable. This permits easy stacking, but also permits the product lining paper 2 to accept 4 dough pieces side by side (with necessary clearance). The lining paper preferably accompanies the four pieces through the entire process. The lining paper upon which the frozen dough is placed is bake on type. The most commonly available type of lining paper is silicon treated paper referred to in the trade as silicon baking paper. The paper is treated on both sides with a silicon and is able to be baked several times. A bar code 3 or similar coding process can be printed or attached to the paper, and such code would be read at various stages through the processes to:
(i) advise the operator by monitor screen of suitable instructions or warnings;
(ii) Automatically set machines to the ideal adjustment settings for processing that type and shape of dough piece (including ovens); and
(iii) At successful completion of the bake, the code can be scanned for production, sales, or stock control.

After supply to the store or bakery, the frozen dough pieces are removed from the box, and permitted to thaw.

The thawing process is preferably conducted in a thawer where the atmosphere around the frozen dough is controlled to provide a consistent product in controllable time periods. The temperature and humidity in the thawer maybe controlled. To ensure that adequate moisture remains in the outer surface of the dough and hence does not have a dried or crusty texture, the or each substantially frozen dough piece may be subjected to predetermined periods of warm air blasts, cooler air blasts and intermittent breaks from the air blasts when no air is directed at the surface of the dough. In the preferred thawing process, the frozen dough is subjected to a warm air blast for a predetermined time which may be in the range of 1-30 minutes but is preferably within the range of about 90 seconds to 25 minutes, more preferably 10-20 minutes. The warm air preferably has a temperature in the range of greater than 30° C. and preferably greater than 35° C. up to a maximum of 38° C. The air flow is preferably 5-15 liters per second with a preferred flow rate of approximately 10 liters per second, per dough piece, at a velocity of 5-15 meters per second and a preferred velocity of approximately 10 meters per second.

Following the warm air blast the thawing process continues preferably under predetermined conditions. To monitor the temperature of the dough pieces, temperature probes may be placed under selected dough pieces. The dough temperature is determined from these probes. In the preferred embodiment, after the initial warm air blast, the dough is subjected to unheated air or air maintained at a cooler temperature eg. ambient air temperature for a predetermined period of time which may be in the range of 1-30 minutes, preferably 90 seconds to 25 minutes and, more preferably 10-20 minutes. The unheated air may be in the range of 25-35° C., preferably 26-31° C.

The heat and humidity in the thaw chamber is then controlled by the combination of warm air convection and steam to provide the predetermined thawing environment.

Referring to FIGS. 5-8, a thawer in accordance with an embodiment of the invention is shown. The thawer is designed to thaw flat, frozen dough pieces, in a controlled and timely manner.

The thawer has input sensors to monitor humidity, air temperature in the thawer, and dough temperature. A faster thaw has been possible by the introduction of warm air onto the dough piece, in particular, the top middle area, as this is found to dry the otherwise wet area that occurs on the dough as it thaws and makes the moisture content of the surface of the dough adequate for processing.

The thawer comprises a cabinet 41 with an access door (not shown). It is a design element that more than one such cabinet be placed side by side and above another, so as to permit a variety of different products to thaw over a predetermined period. A series of separating flat ducts 35, act as floor and ceiling members in the cabinet, and the trays holding the frozen pieces slide in on this duct.

A fan 43 supplies fresh, non returned air to these ducts 35, by way of a collection box 52, holding an electrical heating element 51. A pattern of distribution holes 44 (FIG. 8) are a design element of the duct, and these direct the warm gas or air to the top surface of the dough piece 1.

The trays 45 holding the dough pieces, are designed to have designated or predetermined positions for the dough pieces 1, so as to ensure that the air flow from distribution holes or outlets 44 is directed to the middle, top section of each dough piece. Dough pieces naturally dry out on the periphery, so it is vital that air flow to any other area, other than the top or middle is avoided. Once the air is directed to the dough piece, it is best exhausted with the least drying effect to the dough piece through parts 59 into lateral chambers 56, 57.

On occasion, it is necessary to increase the humidity level in the thawer. To permit this to be done quickly, a water spray just 47 is directed at the heating element 51. A humidity sensor 48 is positioned within the cabinet in close proximity to the dough pieces, and this sensor switches an electrical solenoid (not shown) that supplies water to the spray nozzle. A computer processor receives the input from the humidity sensor 48, indicating that humidity must be increased, decreased or held at that point. In response the supply of water to the spray nozzle is adjusted accordingly.

A series of temperature sensors 49 is fitted to the cabinet 41 and these are placed under selected dough pieces. The temperature of the piece is found to play an important part in timing the period when air flows, and humidity is required. Such inputs are often different for different dough types. A catch tray 50 and drain 53 may also be provided to collect and drain away excess spray water from nozzle 47.

In a typical operation of the thawer in accordance with the invention, the dough pieces 1 are placed on the holding trays 45, and placed in the thawer. A separate dough temperature probe 49 is placed under each dough type in the thawer. Once the door is closed, the fan 43 and heating element 57 are switched on, either until the dough reaches a set temperature, or simply for a preset time. The humidity sensor 48 will trigger the need for more humidity to be injected into the cabinet, should it fall below a preset figure relative to the dough temperature.

The dough piece temperature can be monitored by temperature probe 49 with high degrees of accuracy, and the intervals where the fan is used can be controlled by the dough piece temperature. Typically, flat dough pieces of approximately 400 grams will thaw to +10° C. in 35 minutes, and reach 22° C., in a further 25 minutes. As dough piece maturation occurs at a greater rate, above 10° C., and ideally above 16° C., it is a priority to have the pieces thaw quickly to 10° C., but it is necessary to have the dough piece remain in the 16 to 22° C. range for more than 10 minutes. By turning off the heat and or fan, at 22° C. dough temp, the dough pieces can remain useable for up to a further 45 minutes. This is a desirable production requirement, as delays are common.

The dough is typically thawed by subjecting the dough to heated air for a period of 1-30 minutes. The heating is then turned off but the fan kept running for a further period of 1-30 minutes with ambient air preferably in the range of 25-35° C.

to be directed at the surface of the dough. If the ambient air is below this temperature, the heater 51 may be switched to a lower heating level and left on to provide air at the required temperature.

The thawer is further provided with lateral heating elements 54, 55 within lateral chambers 56, 57. During fan operation, the air directed at the frozen or thawing dough exits the thawing chambers 58 through ports 59 (FIG. 5) into lateral chambers 56, 57. The air then exits lateral chambers 56, 57 through outlets 60.

Once the fan 43 and heater 51 are switched off, lateral heaters 54, 55 are used to heat the air within the lateral chambers 56, 57. The heated air then passes by convection through parts 59 into thawing chambers 58 to provide the heat to complete the thawing process.

An example of the suitable thawing conditions is provided in Table 1.

TABLE 1

| Dough temp. | Thawer air temp. | Thawer humidity |
|---|---|---|
| frozen to 1 deg. | 36 deg. | 40% |
| 1-5 deg. | 35 deg. | 40% |
| 5-10 deg. | 33 deg. | 50% |
| 10-15 deg. | 33 deg. | 65-70% |
| 15-22 deg. | 33 deg. | 70-80% |

It has been found that, in most cases, dough pieces can be moulded, once the dough probe indicates the temperature is above 22° C. It is also found that the dough piece can remain at above 22° C. for longer periods, and the thawer temperature is relatively low at 33 to 36° C. It has been found that high temperatures in the thaw cabinet do not greatly assist thaw time, and the warm air blast, at the start of thawing while the dough is still frozen, reduces thaw time by a greater extent.

Table 2 illustrates a typical thawing cycle in accordance with the invention.

TABLE 2

|  | m/s | litres/s | temp | time |
|---|---|---|---|---|
| initial air blast | 10 | 10 | 34° C. | 15 mins |
| cooler air blast | 10 | 10 | 28° C. | 15 mins |
| fan off | — | — | 34° C. | 5 mins |
| fan on | 10 | 10 | 28° C. | 5 mins |
| fan off | — | — | 34° C. | 5 mins |
| fan on | 10 | 10 | 28° C. | 5 mins |
| fan off | — | — | 34° C. | 5 mins |

Table 3 provides a comparison between thawing in a fast thawer with a warm air blast for 2 minutes and thawing in a thawer without a warm air blast.

TABLE 3

| Temperature | Thaw without air blast (min) | Fast thaw with air blast (min) |
|---|---|---|
| −18° C. (Frozen) to 1° C. | 35 | 17 |
| 1° C.-10° C. | 12 | 8 |
| 10° C.-22° C. | 25 | 25 |

After thawing, the dough pieces of each thawing process were examined and processed. The dough pieces which were not subjected to a warm air blast were found to be too wet on top to be able to be processed through a moulder. By subjecting the frozen dough piece to the initial warm air blast, workable pieces of dough without dry skinning were produced which could be used for processing through a moulder.

To carry out the thawing step, the identified lining paper is placed onto a tray or other conveying means and transferred to a multilevel rack 5. It has been found that a plastic based material can be moulded into a holding tray shape, so that a number (5 or 6) of dough pieces can be placed in set positions on each tray. As all pieces, irrespective of weight are the same length and width, the use of one tray design for all pieces is possible. It has also been found that a surface on the tray that is a plurality of parallel grooves, to assist in creating a non stick surface for the dough piece. The identified lining paper is scanned by a bar code reader as each layer is loaded or after loading. The racks 5 are then transferred to a thawer 7 where a programmed thawing step is conducted. The thawer comprises an enclosure which is temperature controlled to ensure that the frozen dough pieces are heated in a pre-set or pre-determined temperature environment for a pre-determined time period.

Positioning the pieces in specific positions on this tray can assist in providing even thawing, as even spacing of the pieces assists in good distribution of heat and humidity distribution to each piece. Moreover, the thawer includes a series of warm air plenum arranged so that every tray on the rack is separated by a plenum. A pattern of varying size outlets in the bottom of each plenum can direct warm air directly to the desired top surface areas of every dough piece, thus achieving the blast thaw process immediately after loading. Ideally the trays would be colour coded, to easily signify dough type on the tray, as crusty, white and some other dough types as different dough types appear alike. Bar code (or other appropriate indicium) could be moulded into each colour tray, to assist in the dough tracking process from the freezer to the moulder.

The thin thickness of the dough piece allows the thawing process to be quicker and more uniform over the dough piece. The thawer 7 is able to more accurately control the temperature of the dough and the thawing process by a temperature probe 6 which rests on the surface or is inserted into a dough piece or pieces in the thawer. Production requirements in the typical bakery demand that such products be sometimes held at a chilled temperature for use at some future stage, or, thawed quickly without loss of quality, to suit urgent demand. Typically the dough may be considered thawed when it reaches a temperature of 27-30° C.

A further option would be to thaw the piece until supple, and while still cold, mould into the desired shape, tray up, then place in retarder over night so the product is ready for the next days first bake. This is a common practice, but it is more successful if the dough is cold prior to retarding. The process of the invention permits such a practice.

Figure 4:
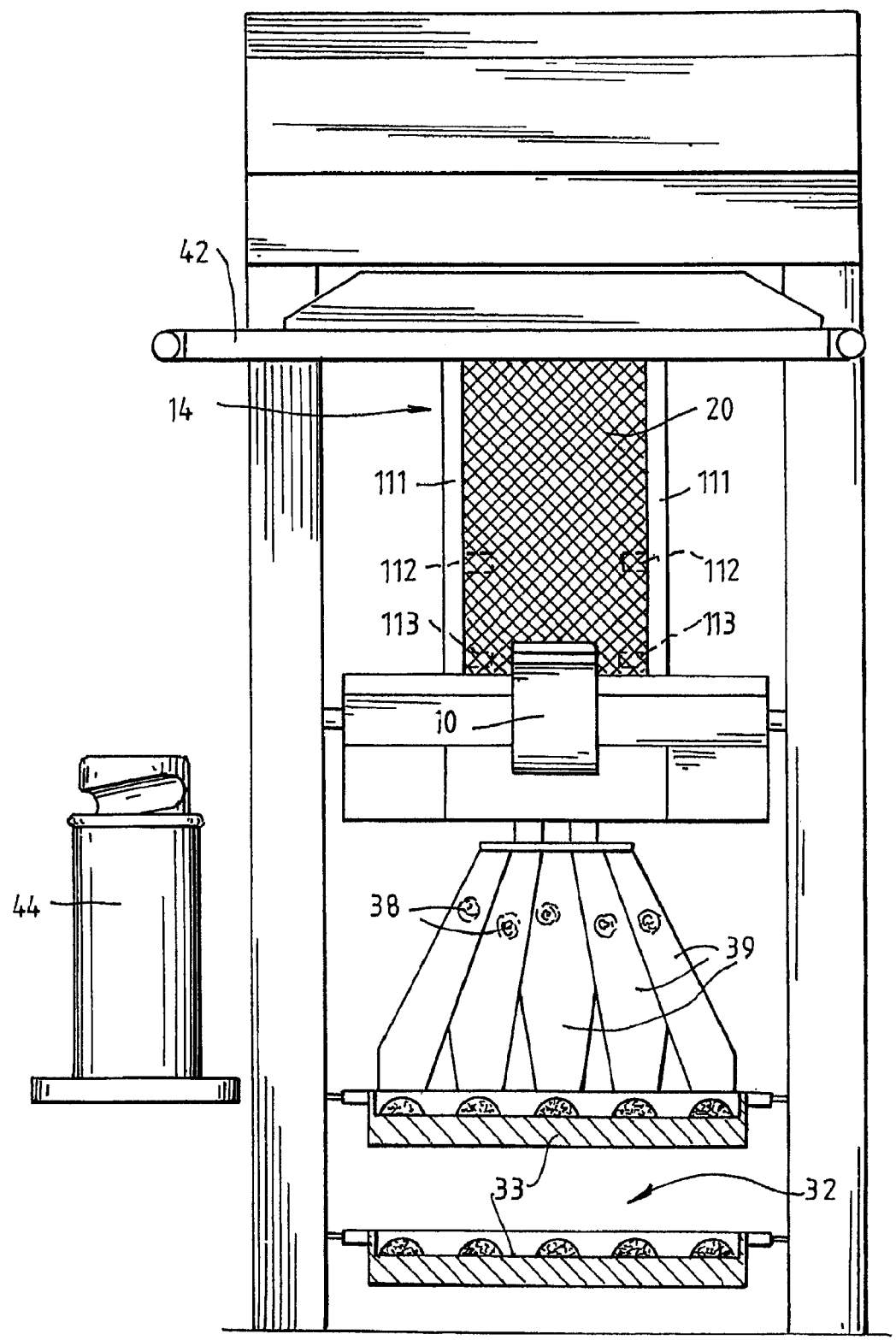
FIG. 4 is a front view of the moulding and processing apparatus shown in FIG. 1.
Figure 5:
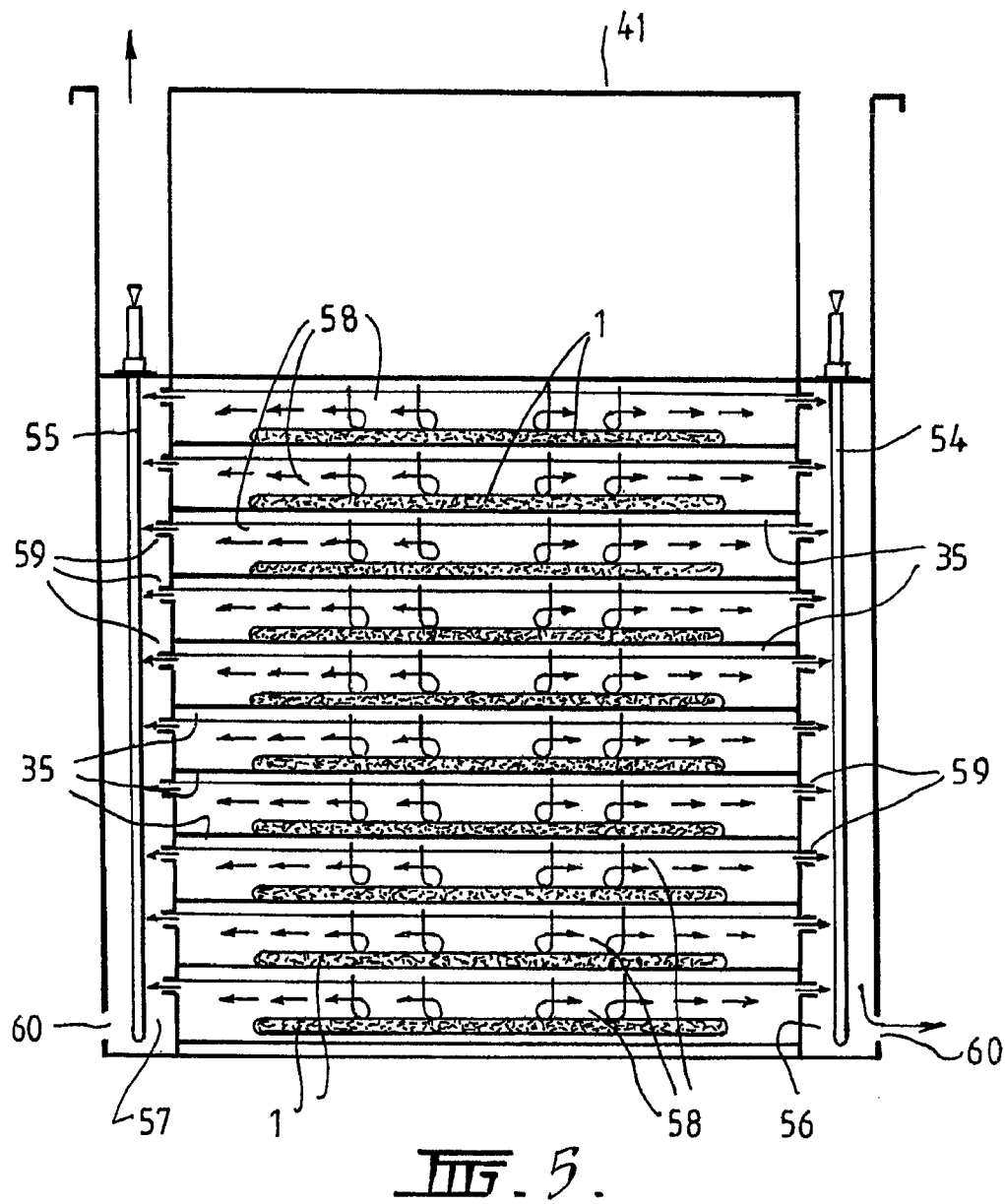
FIG. 5 is an end elevation of a thawer in accordance with an embodiment of the invention.
Figure 6:
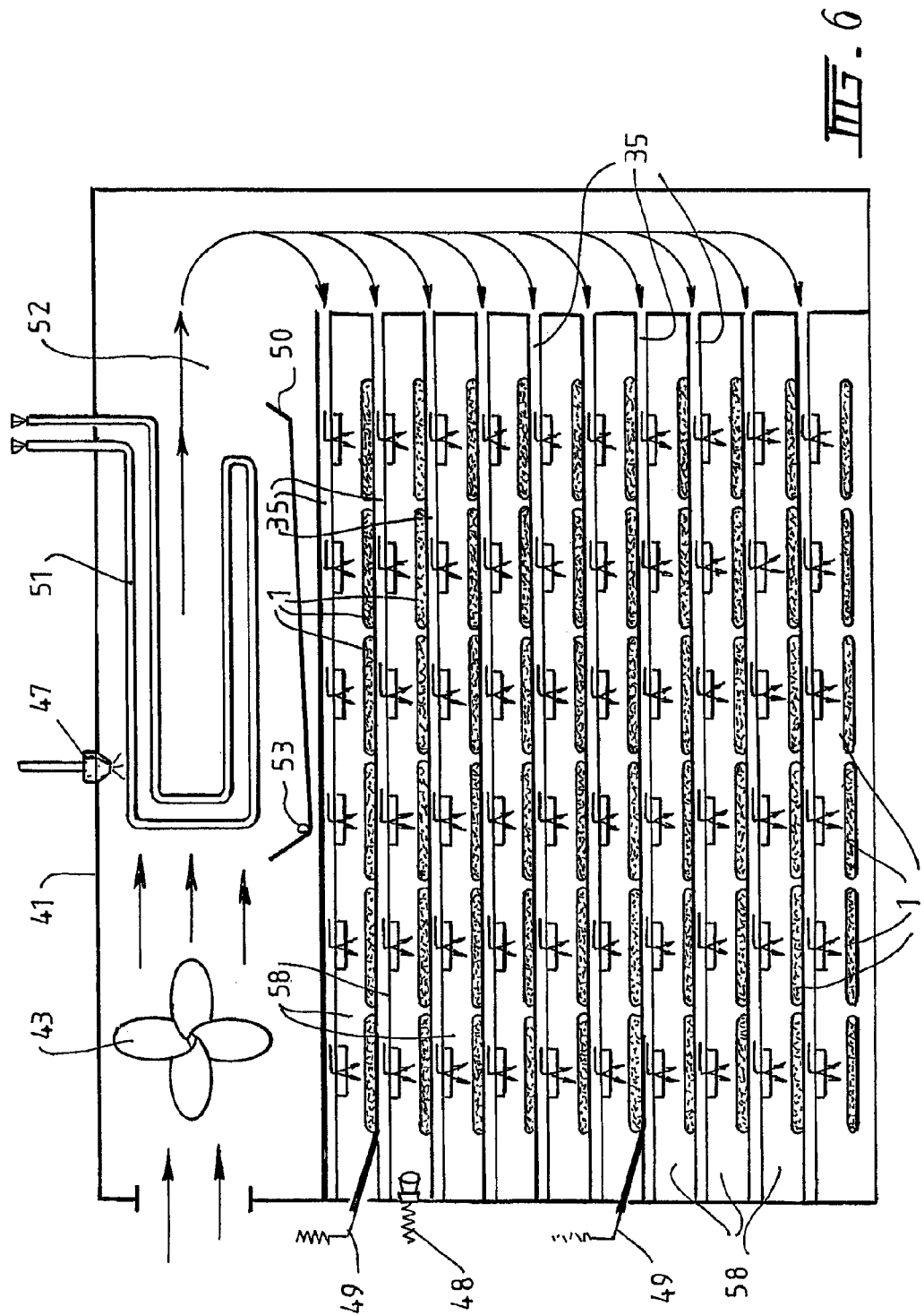
FIG. 6 is a front elevation of the thawer of FIG. 4.
Figure 7:
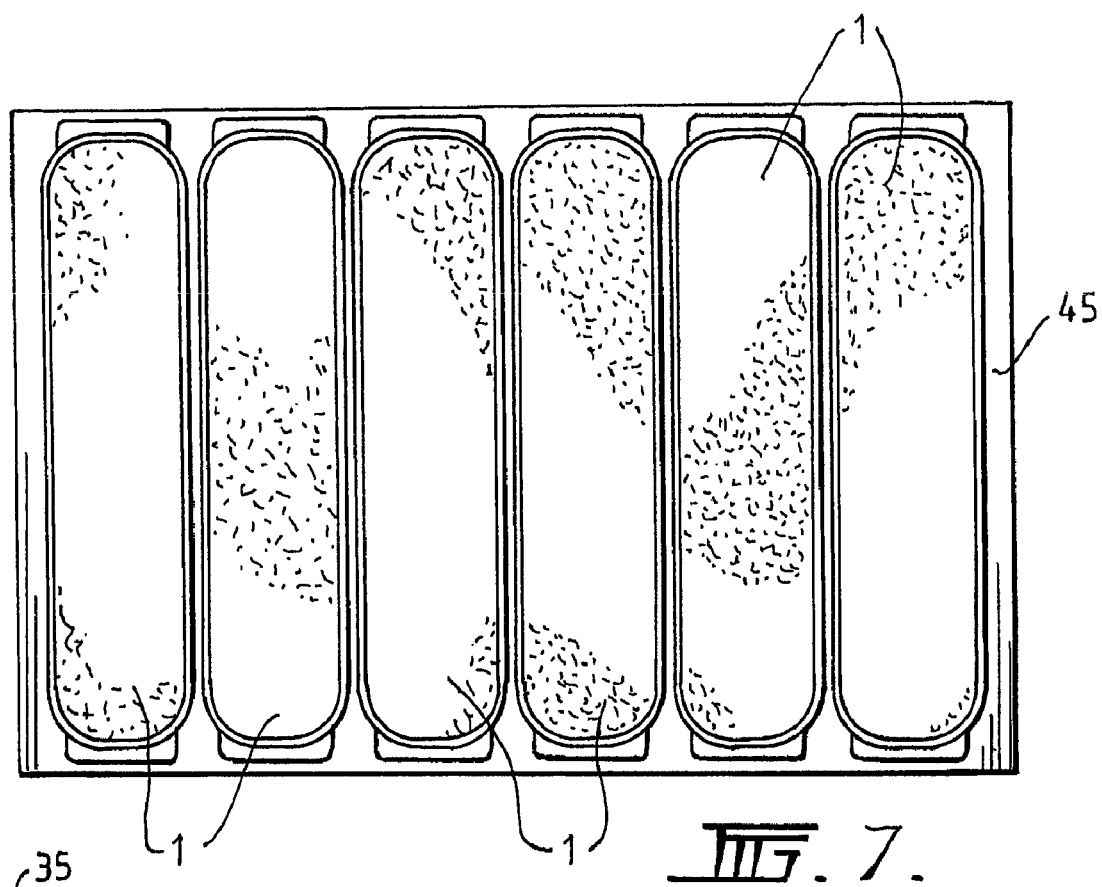
FIG. 7 is a plan view of dough pieces on a tray for positioning in a thawer.

Typical production of non retarded product would be done by first thawing the flat dough piece, and when thawed or substantially thawed, passing these dough pieces through a "Loaf Moulder, Roll Divider" 8. Such a machine will further sheet out the dough piece, then roll it up into a loaf shape (FIG. 3a), or, for bread rolls and split the piece into 4, 5, or 6 pieces of commercially acceptable equal weight (FIGS. 2,4). An apparatus for moulding, dividing and proving the dough is disclosed in a copending international application claiming priority from Australian provisional application no. 2005904579, the whole contents of which is incorporated by reference.

FIG. 2 is a schematic view of a dough moulder 8 utilising a flat thawed dough piece. The flat dough piece pass via inlet conveyor 10 between first and second pairs 11, 12 of counter-rotating dough rollers to further reduce the thickness of the dough to form a relatively thin dough strip. The distance between the rollers 11, 12 is adjustable by actuator 13 connected to roller 12. The dough strip engages a first run 21 spaced below a curling mat 20. The first run 21 and curling mat 20 cooperate to curl the dough strip as illustrated. To prevent both ends of the elongate dough strip curling under the curling mat 20, the curling mat is provided with a raised section 110. The moulder 14 generally has a guide 111 on either side of the conveyor to retain the curling mat 20 in position relative to the first run. The guide is provided with supports 112, 113 which fit between the curling mat and the first run to raise that section 110 of the curling mat to form the beginning or lower edge 114 and end or upper edge 115 of the raised section 110.

The curled dough piece 19 passes around the tail roller 22 of the dough conveyor and a pressure board 26 which is adjustable to enable the gap between the second run 27 of the conveyor belt and the pressure board 26 to be adjusted.

An actuator 24 engages with dough dividers enabling roll dividing blades 36 to pivot into the path of the dough as it passes to the exit end 25 of the pressure board 26. These dough dividing blades 36 are able to be withdrawn out of the pressure board slots 37 to enable loaves to be moulded from the undivided rolled dough. When the roll dividing blades are required to be in the withdrawn position, a diverter tray 28 for the loaf dough pieces is pushed forward closing of the dough separator conduit 39 and directing the dough piece 30 to the front of the machine for placing into tins as loaves (FIG. 3(*a*)).

The actuator 24 may be operated by simply pushing the tray into position to engage or disengage the divider 36. Alternatively, the actuator may be manually operated by the operator. In this way, if the divider position does not correspond with the intended final product being displayed on the operator interface, an alarm may sound requesting the attention of the operator.

When rolls are required as shown in FIG. 2, the tray 8 is in a withdrawn position and the dough dividers 36 extend through slots 37 in the pressure boards. As the dough progresses to the end of the pressure board 26, the dough is separated into predetermined dough portions 38 and is passed by dough separators 39 into trays 33 of a conveyor 32. The tray 33 preferably collects a row of dough pieces all cut from the same rolled dough sheet 30 and transports the dough portions via conveyor 32 from below the dough moulder 14 behind the dough moulder 14 and up to an outfeed belt 42. The speed of the conveyor 32 is adjusted to provide sufficient proving time for the dough portions 38 to relax after being divided. Generally a time period of two to fifteen minutes is required for the dough portions 38 to rest before being passed via outfeed belt 42 to the pop-up roller 44 for further rounding or shaping. After rounding, the roller dough portions is then able to pass to the ovens for baking.

In the case of undivided dough such as used in loaves, after the product progresses though the shaping stage 8, it is returned to its individually identified baking paper and transferred to the prover and oven as shown in step 9 of FIG. 1. By returning the shaped product to the baking paper, the baking paper identifiers can be checked or listed by scanning as a control for proof time and bake control as well as useful production data.

It is widely accepted that dough pieces which are first permitted to slightly prove, before being moulded into the finished shape, will produce product of superior quality. The system of the invention permits such steps as part of its typical production method. Hence, the invention may provide a further step of allowing the dough to prove before being moulded into its final shape.

Many baked products require a flattened dough piece, which is filled, rolled up and individually cut into portions. For the production of such product using the method and apparatus of the invention the dough piece is already presented in the flat form ready to fill etc.

The method of the invention provides a process which can be controlled in the following sequence of steps.

Step 1. A desk top PC, shows the number and type of frozen dough boxes to be removed from the freezer. The frozen pieces are transferred, lining sheet and all, onto wire trays, onto a thawing rack, and wheeled into the thawing chamber. Temperature probes are positioned in or under selected dough pieces. The frozen dough pieces are then subjected to a predetermined thawing process as described above.

Step 2. The computer program will advise when the dough has thawed and reached a set temperature, and, the settings on the moulder shaping machine are also automatically set for the first product. The operator is instructed to select the correct type of dough (preferably indicated by a colour code on the lining paper sheet). Six pieces of dough are placed on a batch loader, that holds the six pieces momentarily, and then feeds them into the moulder shaper, at a predetermined pace. This allows free operation to place the shaped, moulded product back onto its lining paper, and onto baking trays. Six pieces is generally sufficient to fill a standard bakers tray with bread rolls. The PC also shows by photograph the method of laying out or finishing the product as it is placed on the tray.

Step 3. The trayed products are placed on mobile racks, and wheeled into the steam prover. This is a standard process used in most baking methods. The product undergoes an increase in bulk, as it rises in the prover, and this typically takes 30 to 40 minutes. By swiping the bar code on the lining paper, on only the top tray, and quickly passing the bar code reader over the number of trays on the rack, the computer can set a minimum proof time for each product on the rack. As the times expire, the computer instructs the operator to check the product, and if more time is required for extra proof, the bar code reader can be swiped over a +5 minute or +10 minute, permanent bar code sticker placed at the prover.

Step 4. Baking. The scanning of the bar codes on each lining paper can be used to set the oven controls as the trays are loaded. Examples of such settings are:

a oven temperature at start and finish of bake;

steam injection for time and volume;

bake timer; and heat balance from above or below each tray.

The following is an example of the operation of the invention.

The typical supermarket bakery has the daily need to have a small, but full range of products on the shelves by opening time. To avoid the baker starting too early, and to avoid long delays from start time to when product starts to flow from the oven, it is very common for the bakery to be equipped with a "retarder/prover". This permits certain products to be made the day before, and they are chilled or "retarded", so the yeast reaction is slowed. At a preset time, the machine automatically moves to gradual warming, steaming mode, to permit the product to be proved ready for baking at start of work.

The present invention may utilize a "retarder/prover" to provide three alternative modes of production.

Mode 1. Fast start option. The dough pieces are thawed the day before, and while still cold, are moulded into the desired products. These go to the retarder/prover, and are ready for baking at the bakers start time, the next morning. This gives the baker a head start on certain small products, in small volume.

Mode 2. Fast follow up option. Frozen dough is thawed until it warms to approximately 5° C. and is then stored over night on racks in the cold room. This permits the product to be warmed for approximately 30 minutes then moulded into the product types, then proved and baked.

This permits product to flow from the oven approximately 1.5 hours from start time. The product can also be held in the cold room as basic thawed flat dough pieces, for use over a further 3 or 4 hour period.

Mode 3. Fast or slow thaw from frozen. The frozen dough pieces are trayed up, and the rack is wheeled into the thaw cabinet. The product can be thawed and warmed quickly, in approximately 60 minutes or, can be slow thawed so as to permit ongoing draw down of product throughout the day. Using this system, product would flow from the oven approximately 2 hours after start time.

An example of determining a production schedule will now be described.

Each bakery would formulate the days production, and there would be a separate list for each type of dough type, eg. crusty white, plain bun, fruit bun, meal, multi-grain, soy linseed etc. The details of the production run would then be entered through a user interface such as a key pad and screen into a scheduler running a computer program from which the number and type of frozen dough pieces is determined. This is determined from the weight of the frozen dough pieces and the weight of dough required for each product. The timing for the start of the thawing of each frozen dough type may also be determined.

For example the dough piece weight may vary for various dough types:
　　Bun dough—400 g frozen piece=1×400 g loaf of any type or 5×80 g rolls
　　Crusty dough—500 g piece=1×500 g loaf of any type or 5×100 g rolls Thus while the length and width of the frozen dough piece stays the same, but thickness changes to suit difference in weight. In this way, only one box type and size is required for each dough type eg. 8 types of dough=8 types of dough=8 different colours but like sized boxes.

This greatly simplifies the ordering and stock control as well as determining the requirements for freezer space, shelving etc.

From this determination the number of boxes from the freezer can be determined based on the number of frozen dough pieces per box. The production data may also include a priority code to ensure the most needed products are made first. Products that require long cooling periods before slicing and packaging need to be produced before products that can be sold unpackaged and even in a warm state.

The operation of the thawer, shaping apparatus optionally the prover and oven is then controlled by the computer according to the predetermined conditions required and the product is produced as directed by the computer according to a priority order determined by the computer or operator, ie. "A" priority product followed by "B" priority product for each dough type.

Typical production schedule is shown below.

| PRODUCTION SHEET Soft white dough | | | | |
|---|---|---|---|---|
| Product | No. req. | Boxes req. | Trays req. | Priority |
| 500 g hi-top | 12 | | 3 | A |
| 500 g snow top | 20 | | 5 | A |
| 500 g choppa | 8 | | 2 | C |
| 100 g rolls round | 288 | | 8 | C |
| 100 g rolls long | 144 | | 4 | C |
| 100 g rolls c/bacon | 360 | | 6 | B |
| TOTAL BOXES | | | 3 | |

The retard product for the next day is, as usual, produced last.

As shown above the shape of the frozen dough piece is an important aspect of the invention. The importance of the elongated planar shape of the frozen dough piece, and its thickness is important for the following reasons:
(i) The thin dough piece freezes faster—30 minutes or less versus 2 hours for a conventional piece;
(ii) The shape is determined by simply passing a spherical dough piece between two rollers, so it is inexpensive to make;
(iii) The pieces pack compact in the box, with box sizes being typically 900×450×120 mm high, weighing approximately 20 kg, and holding 36 loaf weight pieces, that can make 216 rolls;
(iv) The frozen piece resists damage and breakage as it is thick enough to be robust.
(v) The piece thaws faster being thin, and it avoids core temperature problems, as rolling it up creates a constant temperature throughout;
(vi) The flat piece can be easily stretched out further so the dough can be filled with ingredients and rolled up;
(vii) The piece is the ideal width to be further stretched lengthwise, as it passes through sheeting rollers in the moulder. This long ribbon of dough is then curled back up, creating many laminations in the number of curls of dough. This creates a fine internal texture, with superior loaf shape;
(viii) This long narrow ribbon is ideal for pressure moulding and separating into 5 rolls of approximately the same size;
(ix) The ideal shape to mould french sticks, is the thawed dough shape, that is passed through sheeting rollers sideways. When rolled back up, the stick is more consistent in shape, is already a long shape before final moulding, and the thin laminations created avoid air pockets in the internal texture;
(x) 4 such pieces fit perfectly onto the bakers tray lining paper, that can use the paper as a separator when freezing the pieces on it. The pieces then convert to 4 loaves or 36 rolls, that fit on the same paper through to baking.

The pieces removed from the thawer generally have the same surface consistency on both sides, and are proved to a point where the final moulding (shaping) of the piece, can remove the raw yeast gases that spoil quality and freshness.

As discussed above, the use of a barcode (or similar indicium) to identify dough can assist in both tracking the dough through the various stages of product preparation and baking, in addition to controlling the various production and baking machinery as required and/or instructing the baker.

It is also possible that a separate scheduler determines the production schedule and the schedule is either electronically or manually transferred to the processor. Hence the scheduler can be integral with the processor or a separate program.

Once a baking schedule has been entered into the processor and the processor has determined the order of products and various settings and times required, the processor can provide the baker with all the information required in order to prepare and bake the products entered in the schedule. For example, if, from the product schedule, the processor determines the next required action is to begin preparation for baking 12 dozen long rolls, it will trigger an alarm informing the baker that 4 trays must be thawed. When the baker has retrieved 4 loaded sheets and loaded them into 4 trays, preferably of appropriate colour, the barcodes of the sheets within those trays are scanned by a reader. From the barcodes, the processor determines the type of dough, ensures it is the correct type of dough for the required product, associates that barcode with the particular product being prepared, and informs the baker of the thawing details (or automatically sets the thawer)—i.e. the time required and the settings for the thawer. The thawer with the trays loaded is then started providing the processor with the approximate time that the thawing process started and, consequently, the approximate time it should finish.

Once the thawing process is complete, the baker removes the trays from the thawer and scans the barcodes with a reader once more. The processor recognizes the product associated with those barcodes and informs the baker of the next required step for preparing that product. For example the thawed dough may need to be stretched, worked and separated into round rolls.

If the time estimated by the processor for the completion of the thawing process elapses without the barcode being read, the processor may notify the baker by means of an alarm or similar that the thawing process should be finished.

Once the thawed dough has been prepared into the correct shape, the barcode can be scanned again by a reader to determine the next step of the preparation process. This may be to let the dough prove for a calculated period of time, to add a certain amount of fruit to the dough, or simply to place the dough in the oven for a set period of time at a set temperature.

As can be seen, the processor removes the need for a highly skilled baker by informing the operator at each point of the preparation process exactly what needs to be done in order to end up with the required product. Further, different operators may work on the same products without requiring detailed knowledge of which product it is, at what stage in the preparation the product is at and what is the next step.

By tracking the progress of the preparation of the product by scanning the barcode, in a reader additional quality control checks can be performed. For example if the dough is supposed to thaw for approximately 30 minutes, but by 35 minutes the barcode associated with that product has not been read, the system may inform the baker that the dough should have finished its thawing process and the next step in the preparation of the product started. At this time, the processor may also set a product fail timer—i.e. an estimated time by which the next step in the preparation of the product must begin by. If that product fail time elapses without the correct barcode being received, the processor may be configured to inform the operator that the dough will have spoiled and the product preparation must begin from scratch with a new batch of frozen dough. For example, the estimated time for thawing the dough may be 30 minutes. If the barcode is not read again until 60 minutes has elapsed, the processor will inform the baker that the extra 30 minutes has spoiled the dough.

The processor also provides back-up alarms for the various steps in the preparation process. For example, the thawer will be provided with its own timer and alarm for notifying the operator when the thawing process is complete. If this alarm is missed for some reason, the system will provide its own alarm as it is expecting a barcode to be scanned indicating that the thawing process of a particular product has finished.

While the above describes the processing in relation to one product only, the processor is, of course, capable of keeping track of all products in the baking schedule. For example, once the first product has come out of the thawer and the barcode has been scanned by a reader the processor will recognize that the thawer is now free and the next scheduled product can now be thawed. At this point the processor will display an appropriate message to the baker who will obtain more frozen dough, scan the barcode (which the system will recognize as a new barcode and associate with the appropriate product being prepared) and be led through the baking process by the processor.

Figure 8:
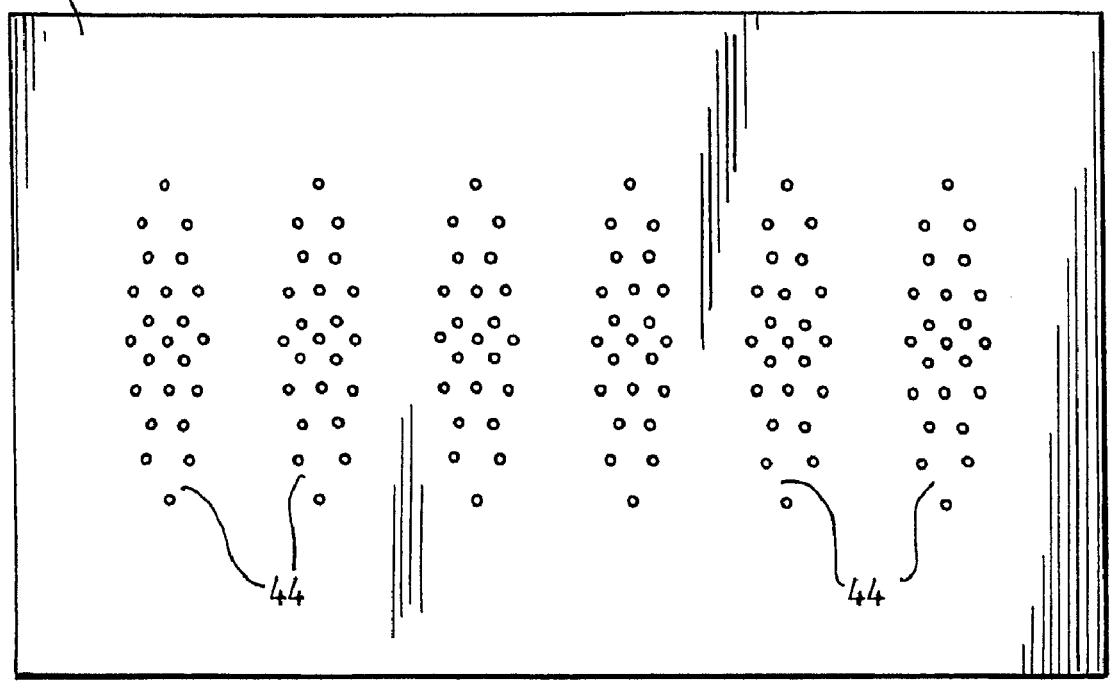
FIG. 8 is a plan view of a pattern of distribution holes which direct the warm air to the top surface of the dough pieces on the trays of FIG. 7.

A simple flow chart is shown in FIG. 8 showing a reader 60 between each step in the preparation and baking process. The reader 60 reads the barcode (or other indicium) identifying the dough, and sends the barcode to the processor 76 which associates that dough with a particular product in the baking schedule. As the frozen dough 62 progresses through each step of the preparation and baking stage (thawing 64, moulding (and proofing) 66, rounding 68 (if required), proofing 70 (if required), baking 72) the barcode is read by the reader 60 preferably as it the dough is entering and leaving each step. The reader 60 then conveys the barcode to the processor 76 which, by reference to the details regarding the product with which the barcode is associated, determines the next step required in the preparation of that product. While the reader 60 has been referred to as a single reader many different readers may of course be used.

Further, while the processor has been described as providing an operator with various alarms and information, the processor could be adapted to mechanise part or all of the preparation and baking procedure. For example, if mechanical apparatus were in place to convey the dough between the various handling machines (thawer, proofer, moulder, rounder, oven etc), the barcodes could be used to determine the type of frozen dough and transport this to the thawer. As the dough passes into the thawer the barcode could be passed by a reader which, as described above, reads the barcode and determines the required product and associated preparation. The processor could then set the thawing details and begin the thaw process. When the requisite thawing time has elapsed, the conveying means could remove the dough from the thawer at which point the barcode is scanned once more, controlling the conveying means to transfer the dough to the next location required in the preparation of the dough, e.g. the roll rounder. When the dough arrives at the roll rounder, the barcode is scanned once more to configure the roll rounder with the required settings, and the dough is passed through the roll rounder.

By reading the barcode as the dough enters and exits each 'stage' of the preparation and baking process, the processor can configure the apparatus as is required for that product (i.e. thawing time, processing required, proofing time, baking time and temperature) as well as direct the conveying means to convey the dough from the current location to the next required location.

Figure 9:
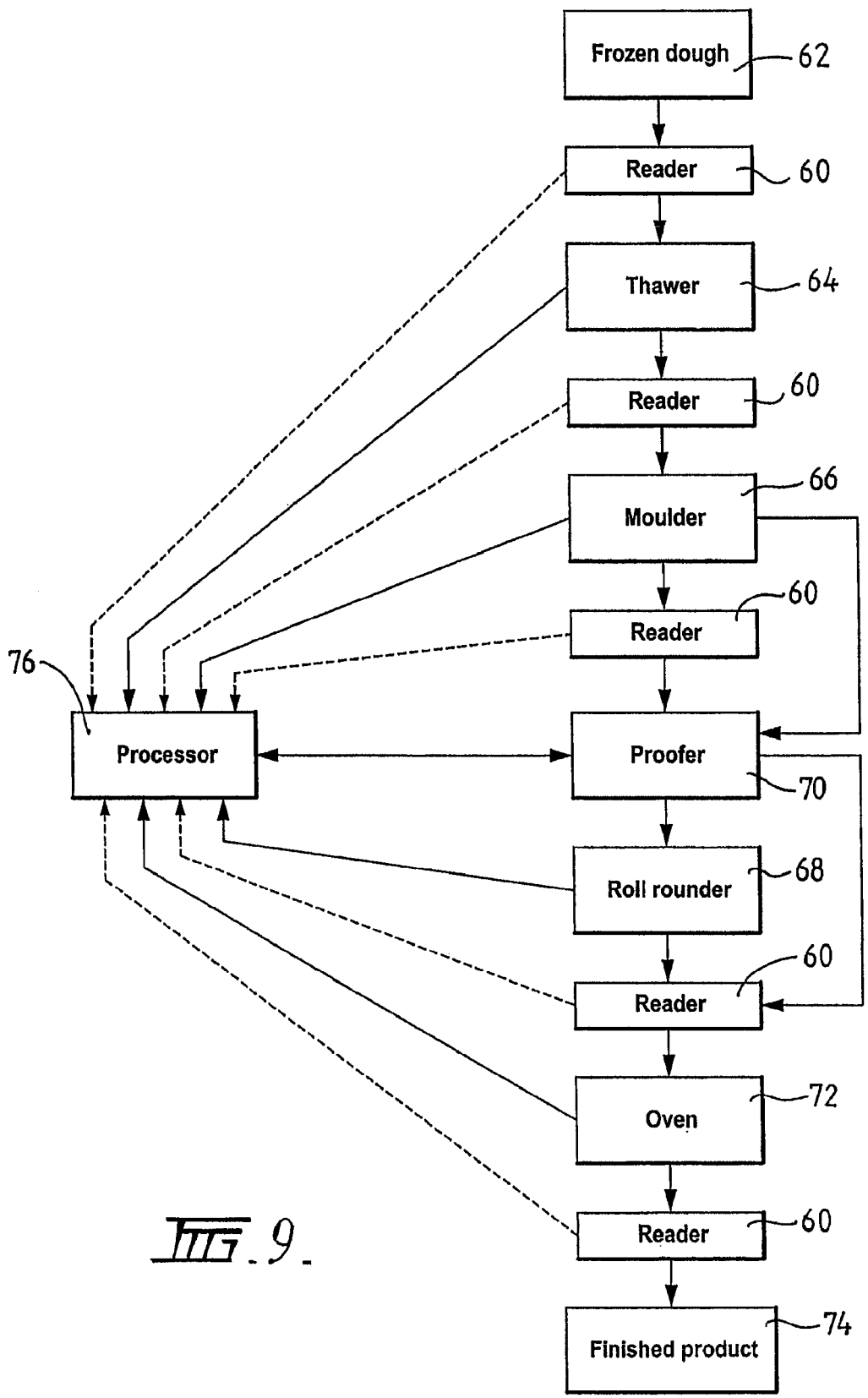
FIG. 9 are flowcharts describing the use of identification indicia to assist in the thawing, preparation and baking procedure.
Figure 10:
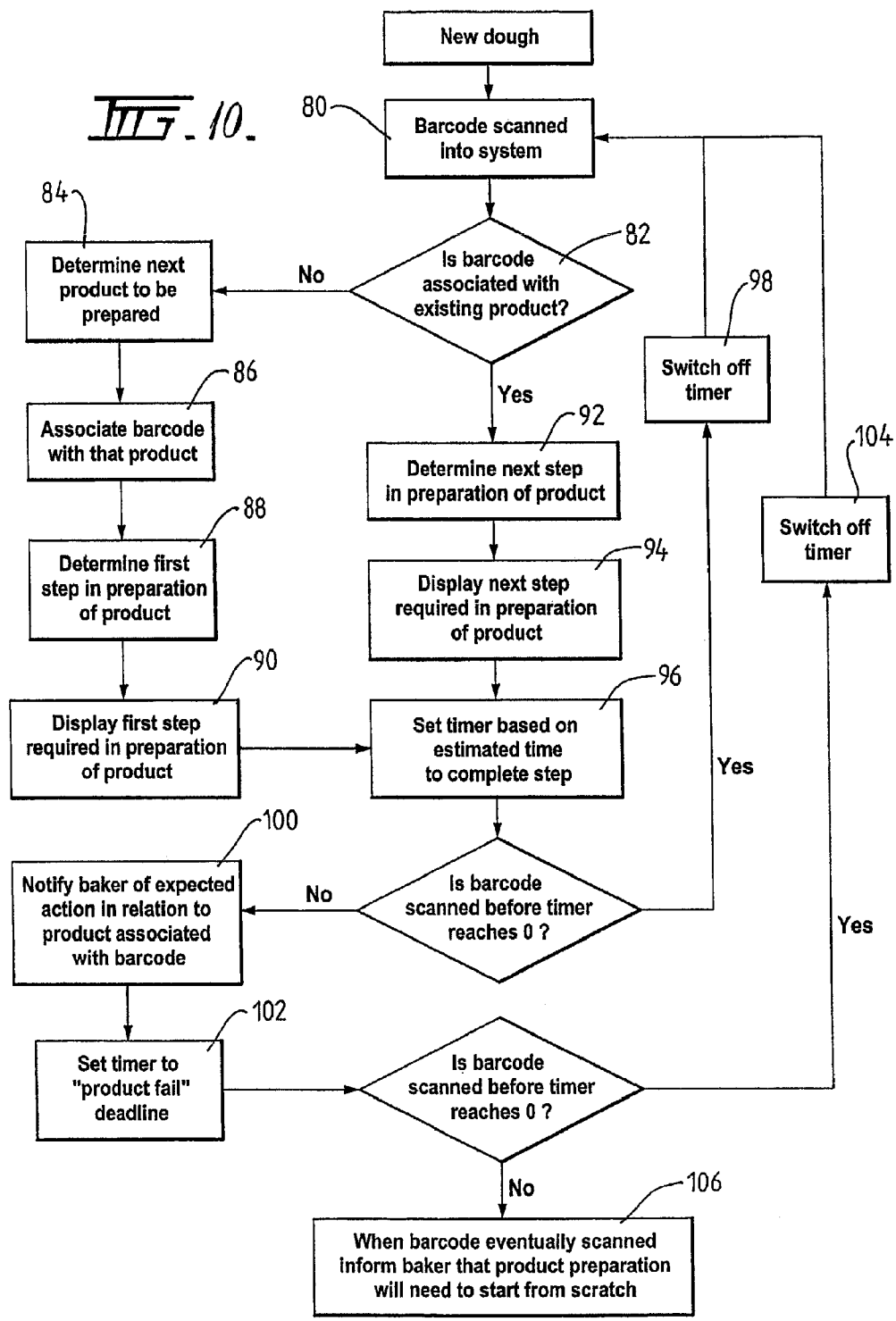
FIG. 10 depicts a simplified flow chart of steps that a processor may follow in order to use barcodes to keep track of products and assist in the preparation and baking process.

FIG. 9 depicts a simplified flow chart of steps that a processor may follow in order to use the scanned barcodes to keep track of products and assist in the preparation and baking process. When a barcode is scanned 80 into the system the processor determines whether the barcode is already associated with an existing product or not 82. If the barcode is not associated with a product the processor refers the baking schedule to determine the next product to be baked that used that particular type of dough 84 and associates the barcode with that product 86. The processor then determines the first step required in the preparation of that product 88 (usually thawing) and notifies the baker of the details of that step 90 (e.g. times and temperatures).

If the scanned barcode is already associated with a product at step 82, the processor determines the next step in the preparation of that product 92 and displays the details of that step to the baker 94.

Once the details of the next step have been displayed (at either step 90 or 94), the processor may set a timer 96 according to the expected time to complete that step. If the barcode associated with the product is scanned before that time elapses, the processor switches off the timer 98 and returns to the start of the process (i.e. a barcode being scanned into the system 80). If the timer set at step 96 elapses without the associated barcode being scanned, the system can notify the baker that an expected action has not taken place 100 and set another "product fail" timer 102. If the appropriate barcode is scanned prior to the product fail timer elapsing, the timer is switched off 104 and the system returns to the start of the process. If the product fail timer elapses the process waits for the barcode to be scanned at which time the baker is informed that the product has failed and preparation of that product needs to begin again 106.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. An apparatus for producing a bread product including:
an input means for entering product variables;
a processor configured to determine a production schedule for producing one or more product types;
a thawer for thawing or partially thawing substantially planar frozen dough pieces;
a moulder for working the thawed or partially thawed dough in accordance with predetermined process steps; and
an oven for baking the moulded dough to form the bread product;
a carrier media for carrying substantially planar frozen dough pieces to the moulder and oven, the carrier media having identification indicia;
an reader for reading identification indicia on the carrier media to identify the thawed or partially thawed dough pieces;
the processor responding to said identification of the thawed or partially thawed dough to control, or instruct an operator to control, the moulder to work the thawed or partially thawed dough in accordance with the predetermined process steps.

2. The apparatus of claim 1 further including a proofer for proving the processed dough pieces, the carrier media carrying the dough pieces to the proofer.

3. The apparatus of claim 1 further including an reader for reading information on the carrier media for the dough entering or exiting the thawer.

4. The apparatus of claim 1 further including an reader for reading information on the carrier media for the dough entering or exiting the moulder.

5. The apparatus of claim 1 further including an reader for reading information on the carrier media for the dough entering or exiting the oven.

6. The apparatus of claim 2 further including an reader for reading indicia on the carrier medium for the dough entering or exiting the proofer.

7. The apparatus of claim 1 wherein the reader is configured to read identification indicia on the carrier media on which the moulded dough pieces are baked to identify the bread product; and
the processor is configured to control or instruct an operator to control the oven according to the identity of the dough pieces.

8. The apparatus of claim 7 wherein the reader and the processor cooperate in response to reading the identification indicia to control, or instruct an operator to control, the next production step for the product type.

9. The apparatus of claim 2 wherein the identity reader is configured to read identification indicia on the carrier media on which the dough pieces to be proofed are carried to identify the dough pieces, and
the processor is configured to control, or instruct an operator to control, the proofer according to the identification of the dough piece.

10. The apparatus of claim 9 wherein the reader and the processor cooperate in response to reading the identification indicia to control, or instruct an operator to control, the next production step according to the identity of dough pieces.

* * * * *